United States Patent
Jiang et al.

(10) Patent No.: US 12,116,010 B2
(45) Date of Patent: Oct. 15, 2024

(54) SAFETY GUARANTEED CONTROL WHEN PLANNING WITH UNCERTAINTY

(71) Applicant: Baidu USA LLC, Sunnyvale, CA (US)

(72) Inventors: Shu Jiang, Sunnyvale, CA (US); Weiman Lin, Sunnyvale, CA (US); Yu Cao, Sunnyvale, CA (US); Jiangtao Hu, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 259 days.

(21) Appl. No.: 17/645,857

(22) Filed: Dec. 23, 2021

(65) Prior Publication Data

US 2023/0202517 A1    Jun. 29, 2023

(51) Int. Cl.
| | |
|---|---|
| *B60W 60/00* | (2020.01) |
| *B60W 30/14* | (2006.01) |
| *B60W 40/02* | (2006.01) |
| *G06N 3/02* | (2006.01) |
| *G06V 20/58* | (2022.01) |

(52) U.S. Cl.
CPC ...... *B60W 60/0011* (2020.02); *B60W 30/143* (2013.01); *B60W 40/02* (2013.01); *B60W 60/0015* (2020.02); *G06N 3/02* (2013.01); *G06V 20/58* (2022.01); *B60W 2555/60* (2020.02); *B60W 2556/40* (2020.02)

(58) Field of Classification Search
CPC .......... B60W 60/0011; B60W 30/143; B60W 40/02; B60W 60/0015; B60W 2555/60; B60W 2556/40; B60W 60/0027; B60W 2554/80; G06N 3/02; G06V 20/58
See application file for complete search history.

(56) References Cited

U.S. PATENT DOCUMENTS

| | | | |
|---|---|---|---|
| 11,787,438 B2* | 10/2023 | Houshmand | B60W 60/0011 701/2 |
| 2014/0142799 A1* | 5/2014 | Ferguson | B60W 30/18163 701/1 |
| 2017/0101097 A1 | 4/2017 | Buchner et al. | |
| 2019/0094865 A1 | 3/2019 | Fletcher | |
| 2022/0185299 A1* | 6/2022 | Ye | B60W 60/00186 |
| 2023/0202473 A1* | 6/2023 | Shalev-Shwartz | G05D 1/0223 701/93 |

FOREIGN PATENT DOCUMENTS

EP    3822142 A1    5/2021

* cited by examiner

*Primary Examiner* — Cao H Nguyen
(74) *Attorney, Agent, or Firm* — WOMBLE BOND DICKINSON (US) LLP

(57) ABSTRACT

According to some embodiments, described herein is a method and a system for guaranteeing safety at a control level of an ADV when at least a portion of a planned path generated by a planning module of the ADV is uncertain due to traffics and/or road condition changes. The planning module, when generating a path, also generate a confidence level of each segment of the path based on one or more of perception data, map information, or traffic rules. The confidence levels are decreasing further away from the ADV. When the control module of the ADV obtains the path and the associated confidence levels, the control module issue control commands to track only one or two segments whose confidence levels exceeds a threshold hold, and issue default control commands for the rest of the path.

17 Claims, 12 Drawing Sheets

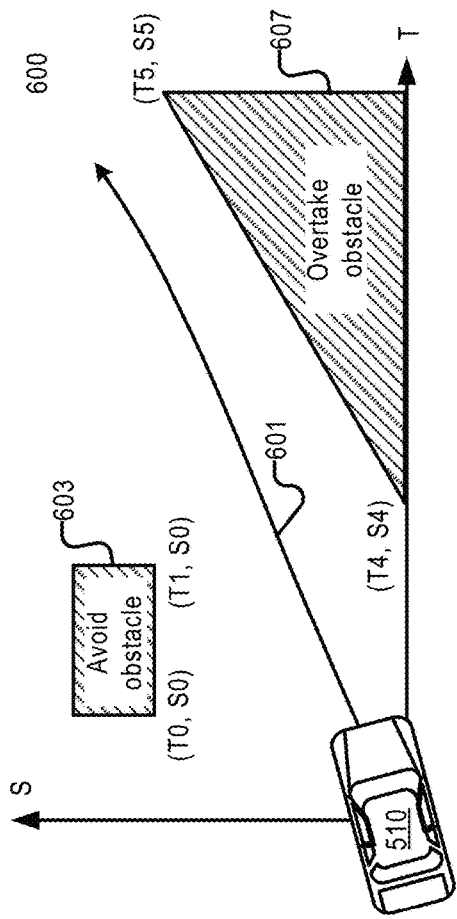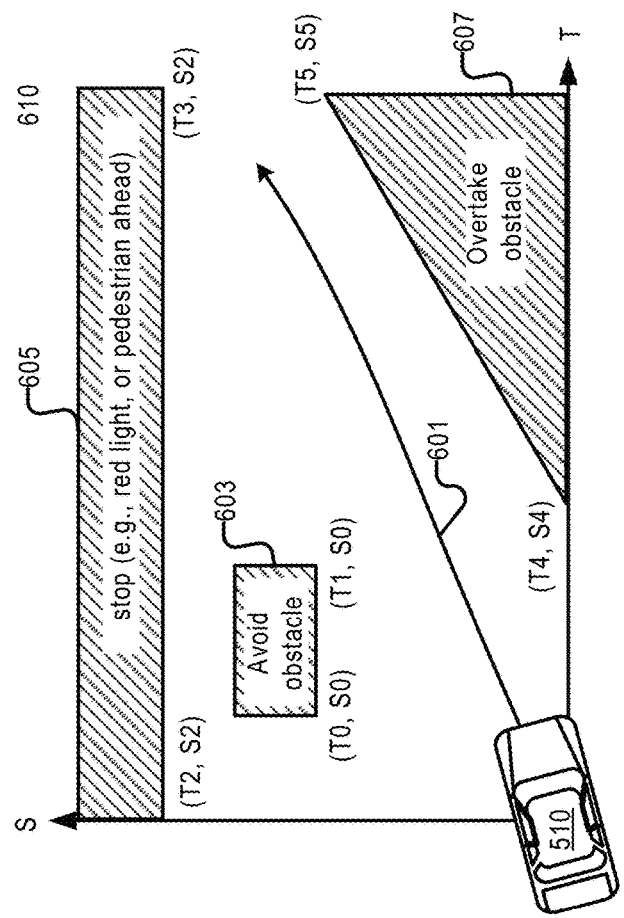

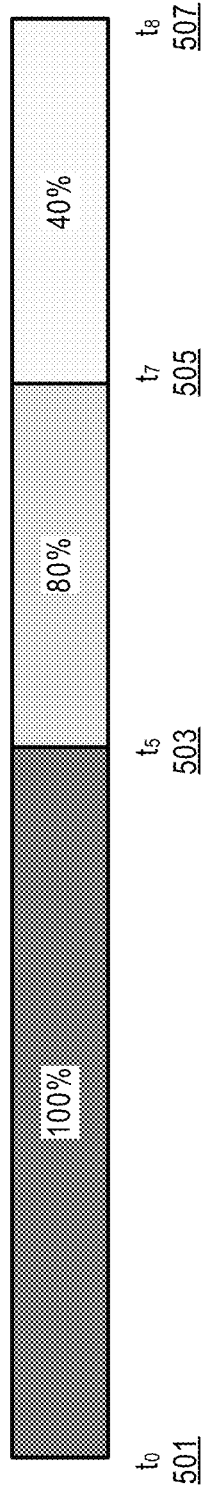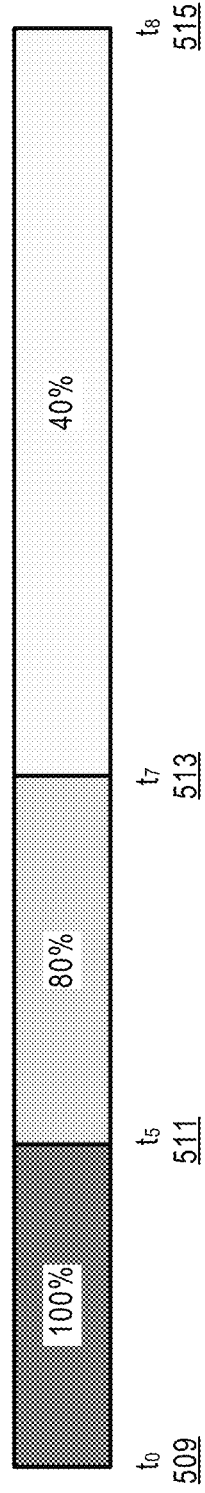

SAFETY GUARANTEED CONTROL WHEN PLANNING WITH UNCERTAINTY

TECHNICAL FIELD

Embodiments of the present disclosure relate generally to operating autonomous driving vehicles. More particularly, embodiments of the disclosure relate to processing planned paths based their confidence levels to ensure safety.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations generates a path based on the perceived environment, and control operations generates control commands to enable the vehicle to track the path.

However, in some driving environments, traffics change fast, and a planned path seconds ago based on the then existing traffic and/or conditions may not be the best path for the vehicle to follow based on the current traffic and/or road conditions. For a planned path for a next period of time, some portions may not be valid when the vehicle gets there. Thus, if the vehicle still tracks the whole path without considering the traffic and/or road conditions changes, the vehicle may expose itself to dangerous conditions in the driving, because the vehicle will effectively tack a path that does not reflect the actual driving environment.

BRIEF DESCRIPTION OF THE DRAWINGS

Embodiments of the disclosure are illustrated by way of example and not limitation in the figures of the accompanying drawings in which like references indicate similar elements.

FIGS. 6A and 6B are block diagrams illustrating station-time maps according to some embodiments.

FIGS. 8A and 8B illustrates two examples of planned paths with different confidence levels.

DETAILED DESCRIPTION

Figure 1:
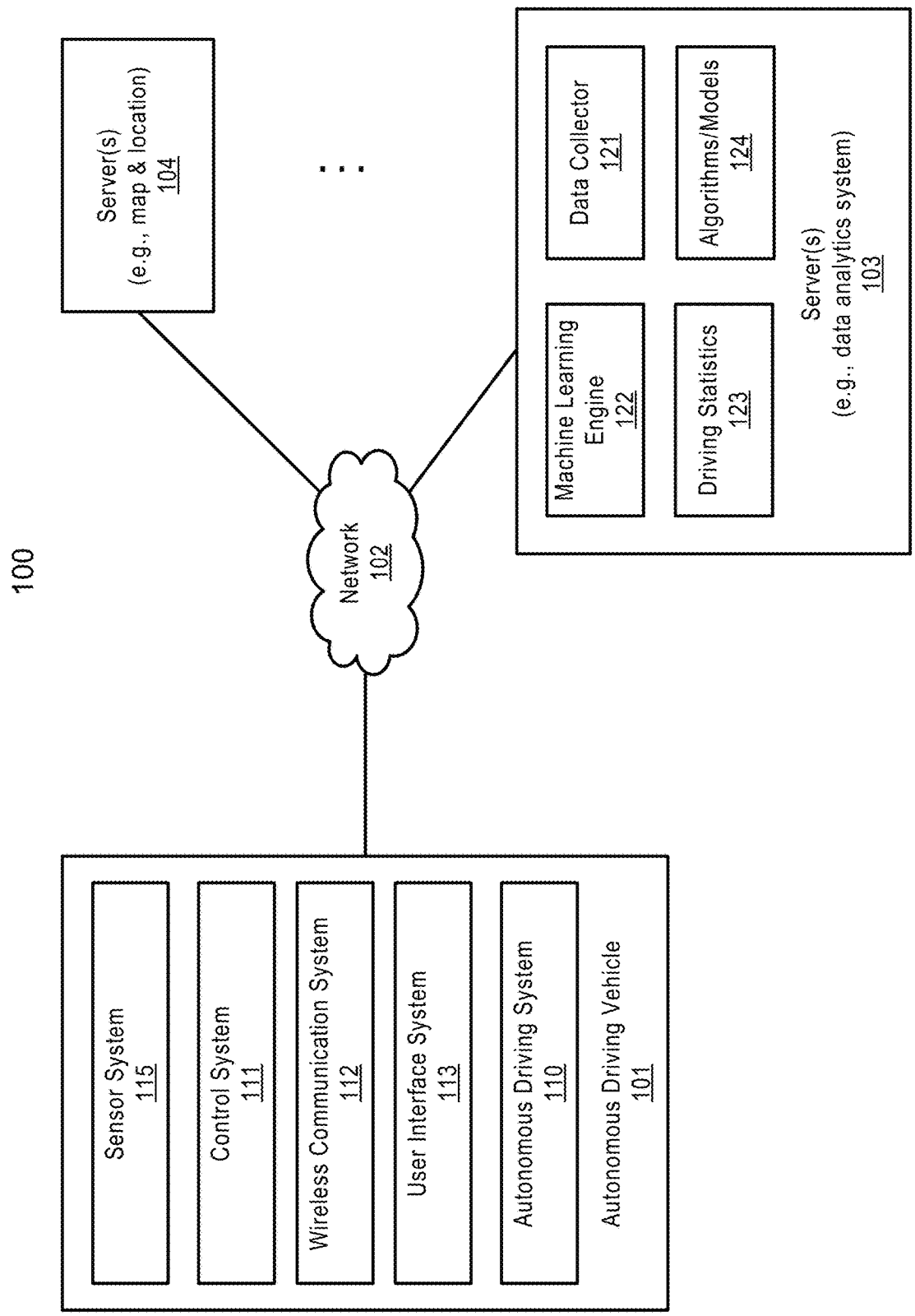
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, described herein is a method and a system for guaranteeing safety at a control level for an ADV when at least a portion of a planned path generated by a planning module of the ADV is uncertain due to traffics and/or road condition changes. The planning module, when generating a path, also generates a confidence level for each segment of the path based on one or more of perception data, map information, or traffic rules. When the control module of the ADV obtains the path and the associated confidence levels, the control module issue control commands to track only one or two segments whose confidence levels exceed a threshold hold, and issue default control commands for the rest of the path.

In the various embodiments described in the disclosure, a path and a trajectory is used interchangeably. The various embodiments can handle the planning uncertainty in a control module, thus ensuring the driving process safer when planning uncertainty exists.

In one embodiment, the one or more parameters that are modified include one or more of a speed, heading, or acceleration of the ADV at each reference point on that adjusted segment. Each of the one or more parameters is modified to be a predetermined constant value.

In one embodiment, the confidence level of each segment of the segments of the path is generated using a set of rules based on perception data, map information, and path rules, or using a trained neural network model. The neural network model is to generate a confidence level for only a first segment of the path, and the planning modules provides a default confidence level for the rest of the path.

In one embodiment, the path and a confidence level for each segment of the path is passed from a planned module of the ADV to a control module of the ADV in a data structure, such as a linked list.

The embodiments described above are not exhaustive of all aspects of the present invention. It is contemplated that the invention includes all embodiments that can be practiced from all suitable combinations of the various embodiments summarized above, and also those disclosed below.

Autonomous Driving Vehicle

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
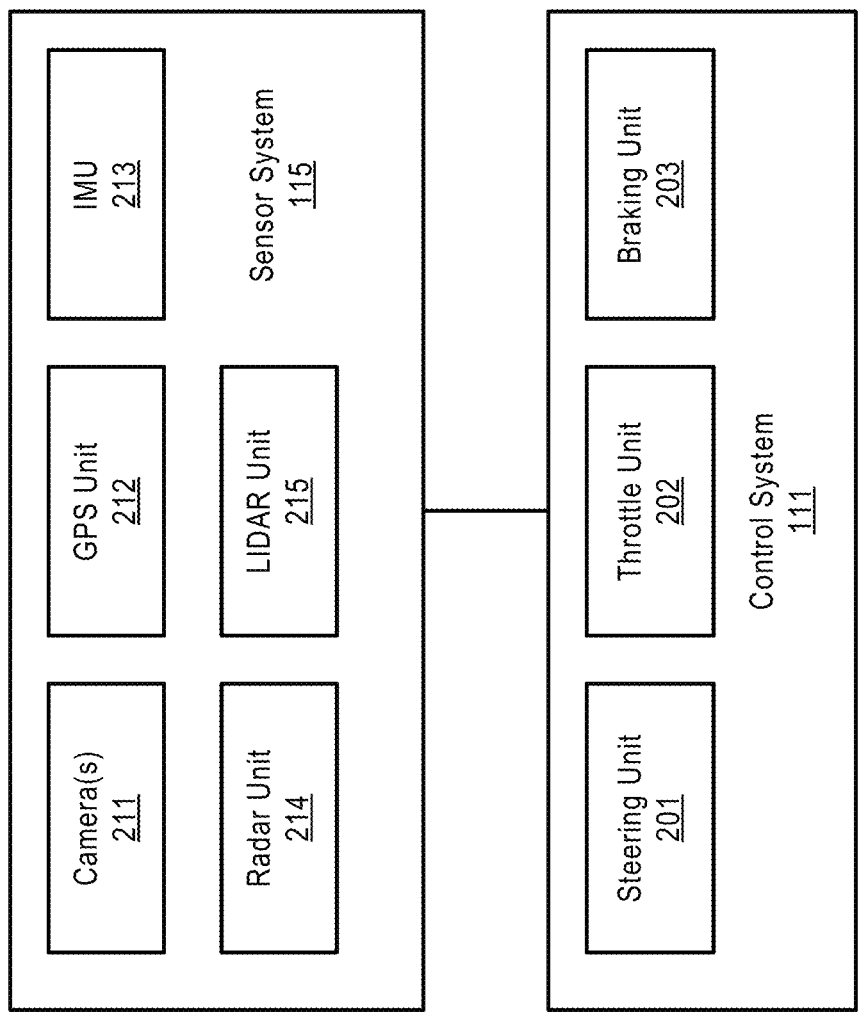
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
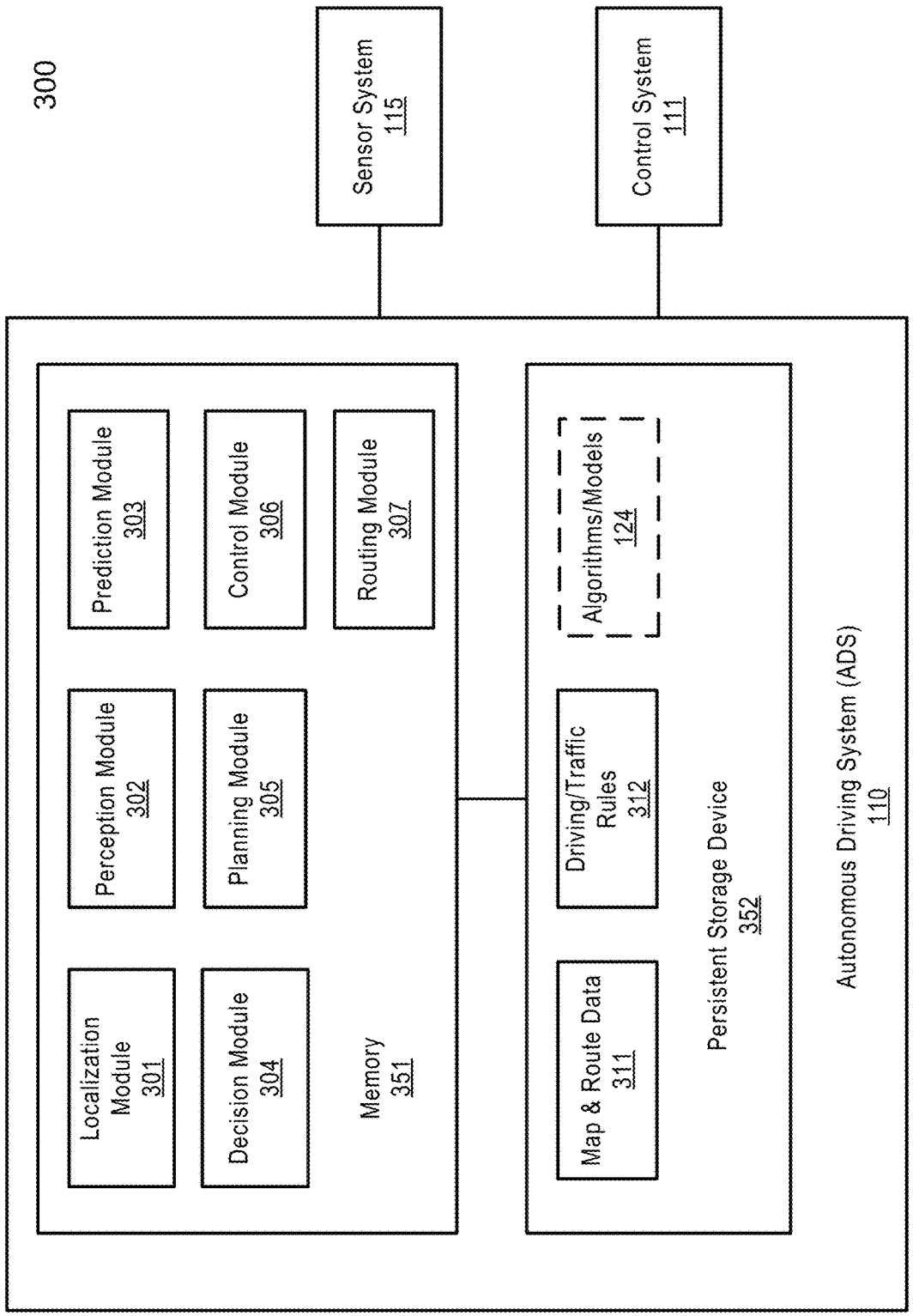
FIGS. 3A-3B are block diagrams illustrating an example of an autonomous driving system used with an autonomous driving vehicle according to one embodiment.
Figure 3B:
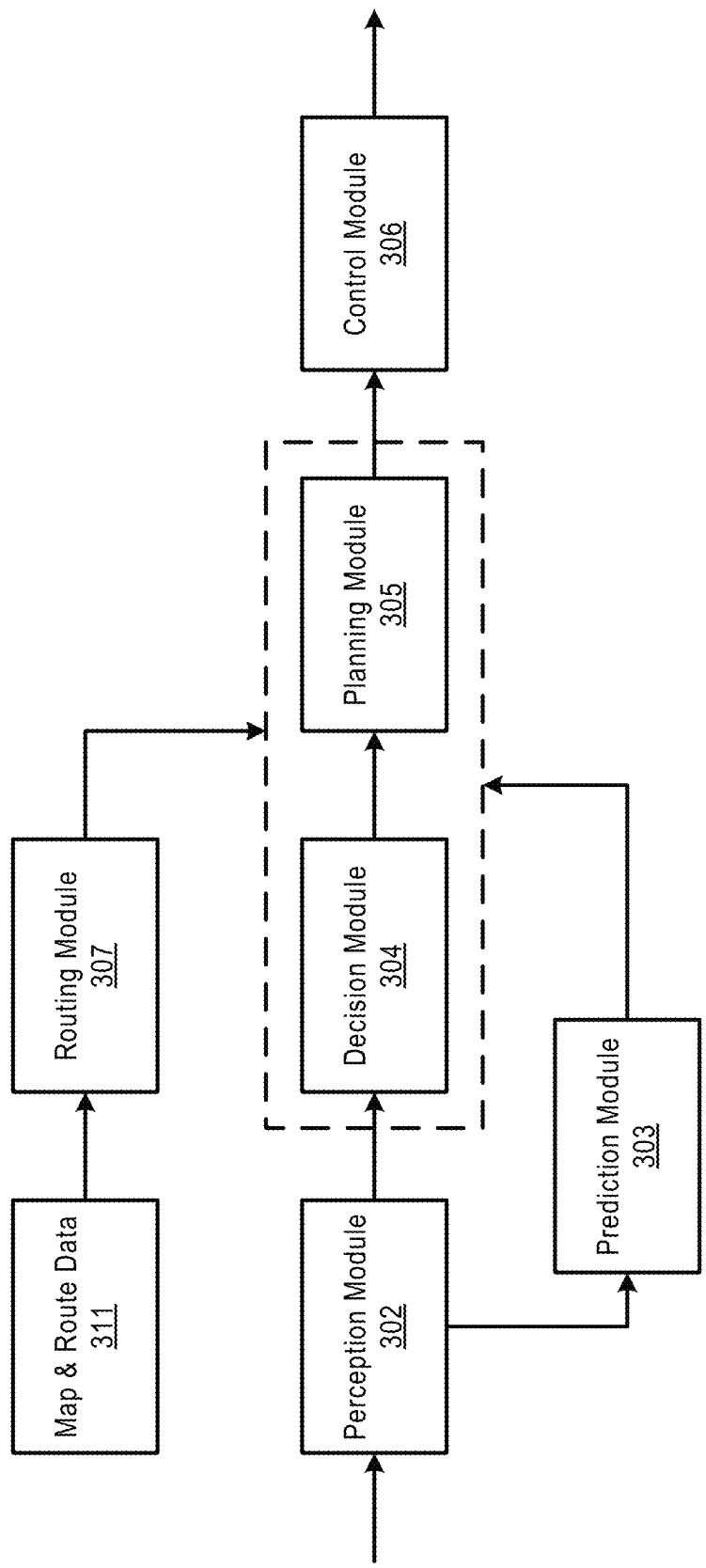

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
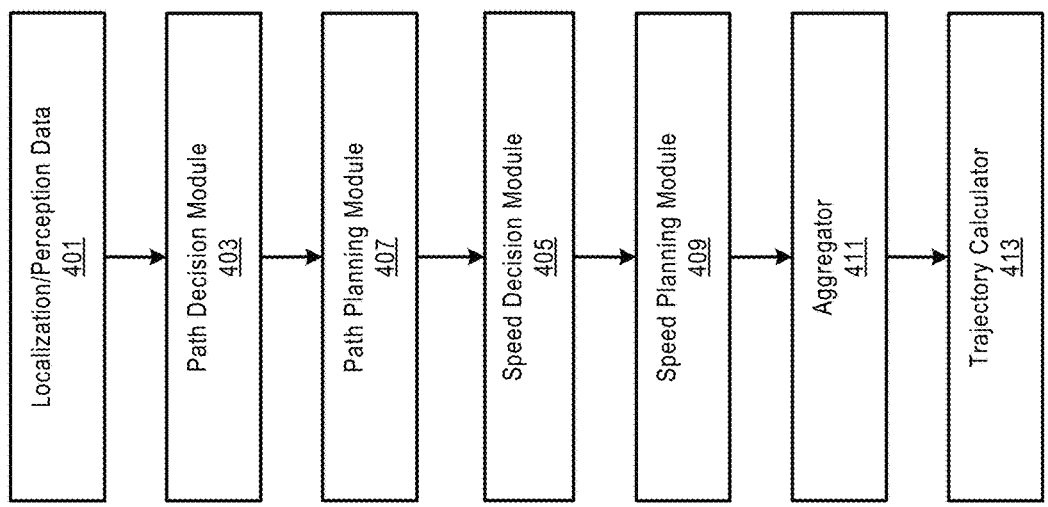
FIG. 4 is a block diagram illustrating an example of a decision and planning system according to one embodiment.

FIG. 4 is a block diagram illustrating an example of a decision and planning system according to one embodiment. System 400 may be implemented as part of autonomous driving system 300 of FIGS. 3A-3B to perform path planning and speed planning operations. Referring to FIG. 4, Decision and planning system 400 (also referred to as a planning and control or PnC system or module) includes, amongst others, routing module 307, localization/perception data 401, path decision module 403, speed decision module 405, path planning module 407, speed planning module 409, aggregator 411, and trajectory calculator 413.

Path decision module 403 and speed decision module 405 may be implemented as part of decision module 304. In one embodiment, path decision module 403 may include a path state machine, one or more path traffic rules, and a station-lateral maps generator. Path decision module 403 can generate a rough path profile as an initial constraint for the path/speed planning modules 407 and 409 using dynamic programming.

In one embodiment, the path state machine includes at least three states: a cruising state, a changing lane state, and/or an idle state. The path state machine provides previous planning results and important information such as whether the ADV is cruising or changing lanes. The path traffic rules, which may be part of driving/traffic rules 312 of FIG. 3A, include traffic rules that can affect the outcome of a path decisions module. For example, the path traffic rules can include traffic information such as construction traffic signs nearby the ADV can avoid lanes with such construction signs. From the states, traffic rules, reference line provided by routing module 307, and obstacles perceived by perception module 302 of the ADV, path decision module 403 can decide how the perceived obstacles are handled (i.e., ignore, overtake, yield, stop, pass), as part of a rough path profile.

For example, in one embedment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time.

In one embodiment, a state-lateral (SL) maps generator (not shown) generates an SL map as part of the rough path profile. An SL map is a two-dimensional geometric map (similar to an x-y coordinate plane) that includes obstacles information perceived by the ADV. From the SL map, path decision module 403 can lay out an ADV path that follows the obstacle decisions. Dynamic programming (also referred to as a dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution.

Speed decision module 405 or the speed decision module includes a speed state machine, speed traffic rules, and a station-time graphs generator (not shown). Speed decision process 405 or the speed decision module can generate a rough speed profile as an initial constraint for the path/speed planning modules 407 and 409 using dynamic programming. In one embodiment, the speed state machine includes at least two states: a speed-up state and/or a slow-down state. The speed traffic rules, which may be part of driving/traffic rules 312 of FIG. 3A, include traffic rules that can affect the outcome of a speed decisions module. For example, the speed traffic rules can include traffic information such as red/green traffic lights, another vehicle in a crossing route, etc. From a state of the speed state machine, speed traffic rules, rough path profile/SL map generated by decision module 403, and perceived obstacles, speed decision module 405 can generate a rough speed profile to control when to speed up and/or slow down the ADV. The SL graphs generator can generate a station-time (ST) graph as part of the rough speed profile.

In one embodiment, path planning module 407 includes one or more SL maps, a geometry smoother, and a path costs module (not shown). The SL maps can include the station-lateral maps generated by the SL maps generator of path decision module 403. Path planning module 407 can use a rough path profile (e.g., a station-lateral map) as the initial constraint to recalculate an optimal reference line using quadratic programming. Quadratic programming (QP) involves minimizing or maximizing an objective function (e.g., a quadratic function with several variables) subject to bounds, linear equality, and inequality constraints.

One difference between dynamic programming and quadratic programming is that quadratic programming optimizes all candidate movements for all points on the reference line at once. The geometry smoother can apply a smoothing algorithm (such as B-spline or regression) to the output station-lateral map. The path costs module can recalculate a reference line with a path cost function, to optimize a total cost for candidate movements for reference points, for example, using QP optimization performed by a QP module (not shown). For example, in one embodiment, a total path cost function can be defined as follows:

$$\text{path cost} = \Sigma_{points}(\text{heading})^2 + \Sigma_{points}(\text{curvature})^2 + \Sigma_{points}(\text{distance})^2,$$

where the path costs are summed over all points on the reference line, heading denotes a difference in radial angles (e.g., directions) between the point with respect to the reference line, curvature denotes a difference between curvature of a curve formed by these points with respect to the reference line for that point, and distance denotes a lateral (perpendicular to the direction of the reference line) distance from the point to the reference line. In some embodiments, distance represents the distance from the point to a destination location or an intermediate point of the reference line. In another embodiment, the curvature cost is a change between curvature values of the curve formed at adjacent points. Note the points on the reference line can be selected as points with equal distances from adjacent points. Based on the path cost, the path costs module can recalculate a reference line by minimizing the path cost using quadratic programming optimization, for example, by the QP module.

Speed planning module 409 includes station-time graphs, a sequence smoother, and a speed costs module. The station-time graphs can include a ST graph generated by the ST graphs generator of speed decision module 405. Speed planning module 409 can use a rough speed profile (e.g., a station-time graph) and results from path planning module 407 as initial constraints to calculate an optimal station-time curve. The sequence smoother can apply a smoothing algorithm (such as B-spline or regression) to the time sequence of points. The speed costs module can recalculate the ST graph with a speed cost function to optimize a total cost for movement candidates (e.g., speed up/slow down) at different points in time.

For example, in one embodiment, a total speed cost function can be:

$$\text{speed cost} = \Sigma_{points}(\text{speed}')^2 + \Sigma_{points}(\text{speed}'')^2 + (\text{distance})^2,$$

where the speed costs are summed over all time progression points, speed' denotes an acceleration value or a cost to change speed between two adjacent points, speed'' denotes a jerk value, or a derivative of the acceleration value or a cost to change the acceleration between two adjacent points, and distance denotes a distance from the ST point to the destination location. Here, the speed costs module calculates a station-time graph by minimizing the speed cost using quadratic programming optimization, for example, by the QP module.

Aggregator 411 performs the function of aggregating the path and speed planning results. For example, in one embodiment, aggregator 411 can combine the two-dimensional ST graph and SL map into a three-dimensional SLT graph. In another embodiment, aggregator 411 can interpolate (or fill in additional points) based on two consecutive points on an SL reference line or ST curve. In another embodiment, aggregator 411 can translate reference points from (S, L) coordinates to (x, y) coordinates. Trajectory generator 413 can calculate the final trajectory to control ADV 510. For example, based on the SLT graph provided by aggregator 411, trajectory generator 413 calculates a list of (x, y, T) points indicating at what time should the ADC pass a particular (x, y) coordinate.

Thus, path decision module 403 and speed decision module 405 are configured to generate a rough path profile and a rough speed profile taking into consideration obstacles and/or traffic conditions. Given all the path and speed decisions regarding the obstacles, path planning module 407 and speed planning module 409 are to optimize the rough path profile and the rough speed profile in view of the obstacles using QP programming to generate an optimal trajectory with minimum path cost and/or speed cost.

Figure 5:
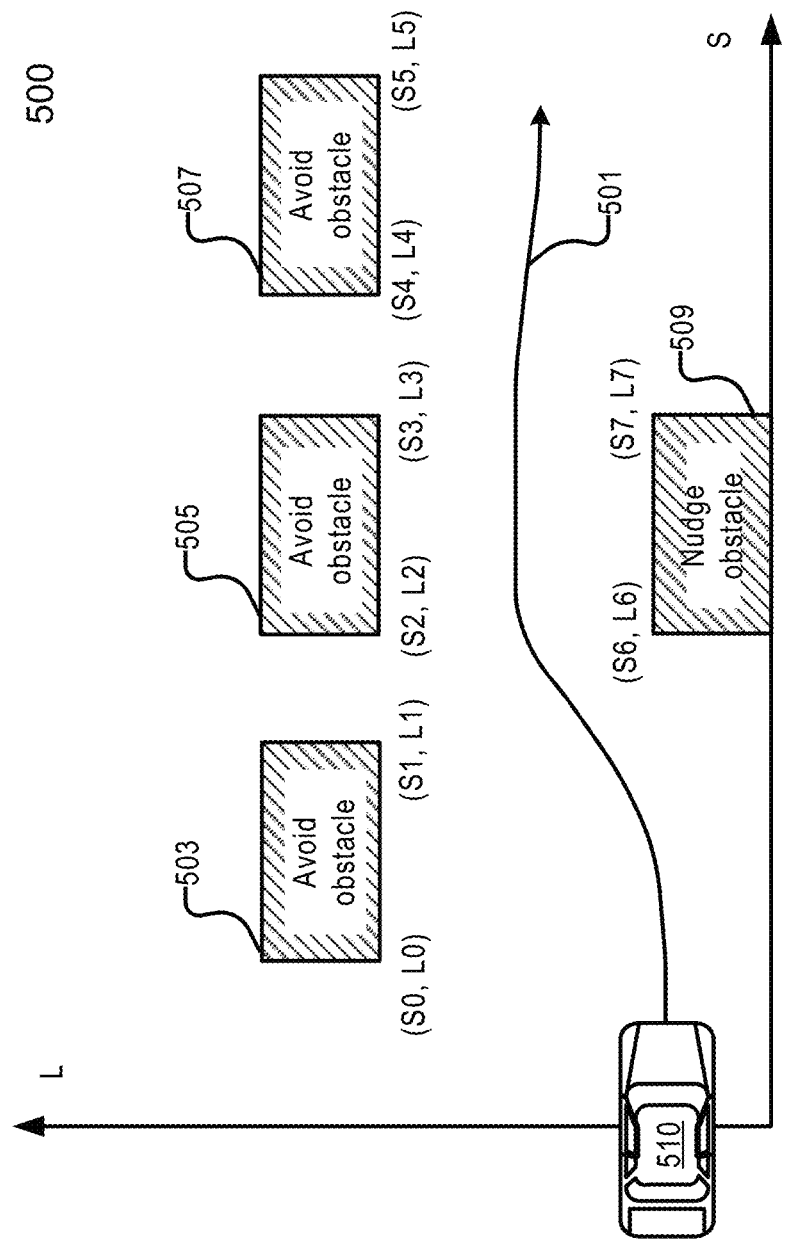
FIG. 5 is a block diagram illustrating a station-lateral map according to one embodiment.

FIG. 5 is a block diagram illustrating a station-lateral map according to one embodiment. Referring to FIG. 5, SL map 500 has an S horizontal axis, or station, and an L vertical axis, or lateral. As described above, station-lateral coordinates are a relative geometric coordinate system that references a particular stationary point on a reference line and follows the reference line. For example, a (S, L)=(1, 0) coordinate can denote one meter ahead of a stationary point (i.e., a reference point) on the reference line with zero meter lateral offset. A (S, L)=(2, 1) reference point can denote two meters ahead of the stationary reference point along the reference line and an one meter perpendicular lateral offset from the reference line, e.g., a left offset.

Referring to FIG. 5, SL map 500 includes reference line 501 and obstacles 503-509 perceived by ADV 510. In one embodiment, obstacles 503-509 may be perceived by a RADAR or LIDAR unit of ADV 510 in a different coordinate system and translated to the SL coordinate system. In another embodiment, obstacles 503-509 may be artificially formed barriers as constraints so the decision and planning modules would not search in the constrained geometric spaces. In this example, a path decision module can generate decisions for each of obstacles 503-509 such as decisions to avoid obstacles 503-508 and nudge (approach very closely)

obstacle 509 (i.e., these obstacles may be other cars, buildings and/or structures). A path planning module can then recalculate or optimize reference line 501 based on a path cost in view of obstacles 503-509 using QP programming to fine tune reference line 501 with the minimum overall cost as described above. In this example, the ADV nudges, or approaches very close, for obstacle 509 from the left of obstacle 509.

FIGS. 6A and 6B are block diagrams illustrating station-time maps according to some embodiments. Referring to FIG. 6A, ST graph 600 has a station (or S) vertical axis and a time (or T) horizontal axis. ST graph 600 includes curve 601 and obstacles 603-607. As described above, curve 601 on station-time graph indicates, at what time and how far away is the ADV from a station point. For example, a (T, S)=(10000, 150) can denote in 10000 milliseconds, an ADV would be 150 meters from the stationary point (i.e., a reference point). In this example, obstacle 603 may be a building/structure to be avoided and obstacle 607 may be an artificial barrier corresponding to a decision to overtake a moving vehicle.

Referring to FIG. 6B, in this scenario, artificial barrier 605 is added to the ST graph 610 as a constraint. The artificial barrier can be examples of a red light or a pedestrian in the pathway that is at a distance approximately S2 from the station reference point, as perceived by the ADV. Barrier 605 corresponds to a decision to "stop" the ADV until the artificial barrier is removed at a later time (i.e., the traffic light changes from red to green, or a pedestrian is no longer in the pathway).

Safety-Guaranteed Control

Figure 7:
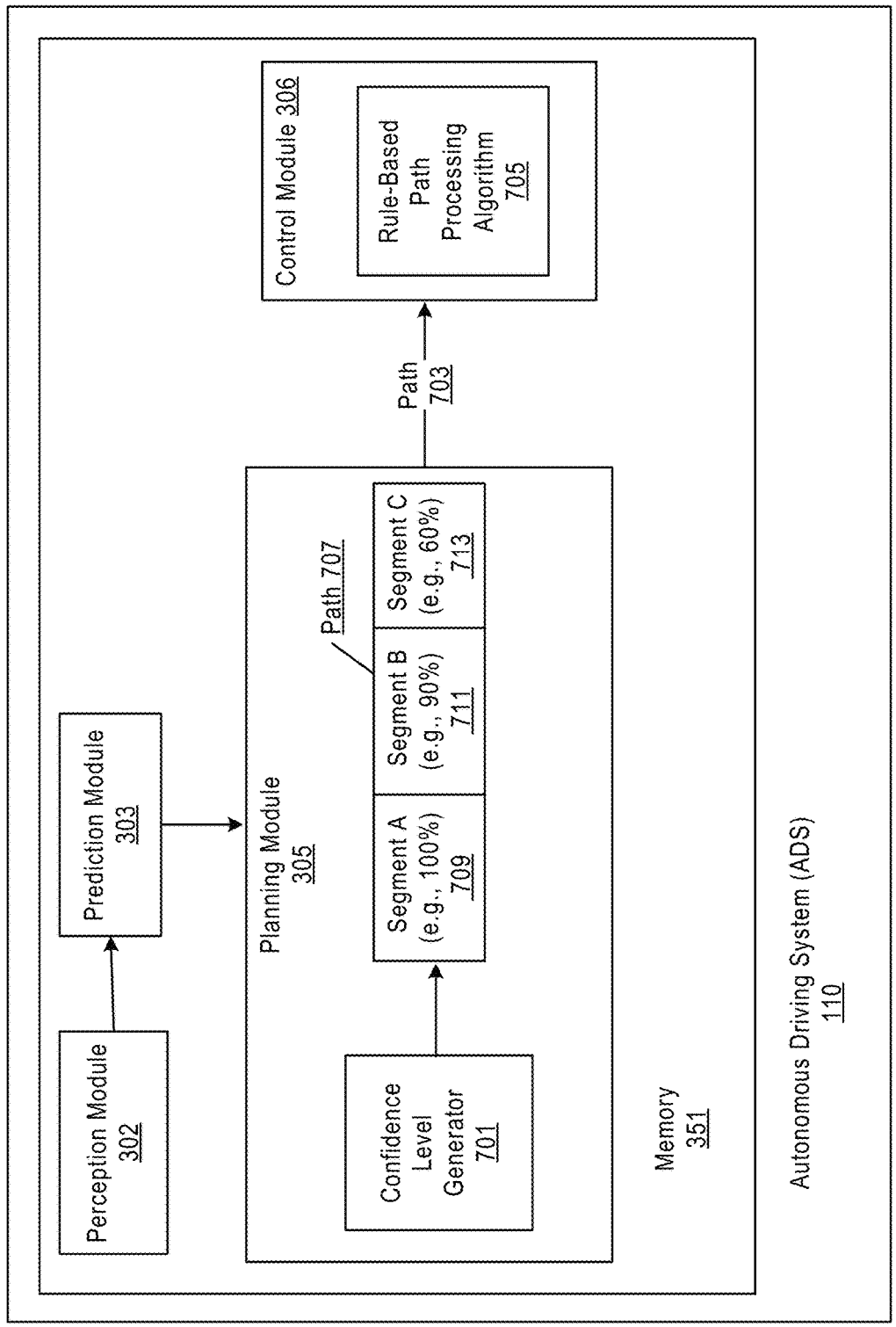
FIG. 7 illustrates a system for safety-guaranteed control when planning with uncertainty according to one embodiment.

FIG. 7 illustrates a system for safety-guaranteed control when planning with uncertainty according to one embodiment. As shown in FIG. 7, a confidence level generator 701 can be provided in the planning module 305 for generating a confidence level for each segment of a path planned by the planning module 305.

In one embodiment, the planning module 305 can generate a planned path (also referred to as a planned path) for a following time interval (e.g., for the next 8 seconds). Each planned path can be a data structure (e.g., a linked list) that include information describing a number of parameters for each reference point on the planned path. The parameters for each reference point can include a speed, a curvature, and a heading. The parameters specify the expected actions or states for the ADV at each reference point.

In this embodiment, the planning module 305, when generating a planned path 707, can divide the planned into multiple segments, each segment having a different confidence level. For example, the planned path 707 is divided into segment A 709, segment B 711, and segment C 713. The segment A 709 has a confidence level 100%, the segment B 711 has a confident level 90%, and the segment C 713 has a confidence level 60%. These confidence levels are just illustrative examples. In many situations, a planned path can have confidence indicators that do not change that much from one segment to the next. For example, a planned path with three segments can have three confidence levels that are 100%, 99%, and 95% respectively.

In one embodiment, the higher a confidence level for a particular segment of the path, the less likely the planning module 305 would modify the particular segment when the ADV arrives at that particular segment when generating new trajectories in future planning cycles.

For example, for the segment A with a 100% confidence level, the ADV will not modify the segment and thus will issue control commands ((e.g., throttle, brake, steering control commands) to track the segment. For the segment C with a confidence level 60%, the ADV will likely to modify the path segment when the ADV reaches that segment.

In one embodiment, the confidence level for each of the planned path is a reflection of traffic and/or road conditions of a segment of the physical road corresponding to that segment of the planned path. In a real-world driving environment, e.g., in a busy street with constantly changing traffic and/or road conditions, a planned path generated at a particular time (e.g., to) may not be the optimal path at another time (e.g., $t_{0+5}$) due to the change in traffic and/or road conditions. The further away a corresponding physical road segment is from the ADV at the time when the planned path is generated, the lower the confidence level is for the corresponding path segment, because the traffic and/or road conditions would be more uncertain by the time the ADV reaches that road segment.

In one embodiment, the confidence level generator 701 can implement an algorithm that takes perception data, map information, and traffic rules as input to generate confidence levels for the planned path 707. Alternatively, a trained neural network model can be used to generate confidence levels for the planned path 707.

The planned path 707 and the associated confidence levels for different segments 709, 711, and 713 of the planned path can be passed 703 to the control module 306, which can implement a ruled-based path processing algorithm 705 to process the planned path 707.

For example, the control module 306 can issue multiple sets of control commands in a sequence to enable the ADV to track a path segment with the lowest cost only when the associated confidence level for the path segment exceeds a threshold hold (e.g., 95%). For those path segments whose confidence levels do not exceed the threshold, the control module 306 issue multiple sets of default control commands in a sequence.

Thus, by tracking path segments with high confidence levels, the ADV can expose itself to less dangers, thus improving the safety of the ADV.

FIGS. 8A and 8B illustrates two examples of planned paths with different distributions of confidence levels. The path illustrated in FIG. 8A has three segments. The first segment starts from $t_0$ 501 and ends at $t_5$ 503, and has a confidence level of 100%; the second segment starts at $t_5$ 503 and ends at $t_7$ 505, and has a confidence level of 80%; and the third segment starts $t_7$ 505 and ends at $t_8$ 507, and has a confidence level of 40%. As shown, the confidence level for a path segment decreases as the path segment is further away from the time to when the path is generated.

In FIG. 8B, due to changes in the traffic conditions and/or road conditions, the confidence level distribution of the planned path changes accordingly. Although the planned path still has three segments, i.e. the first segment between $t_0$ 509 and $t_5$ 511 with a confidence level of 100%, the second segment between $t_5$ 511 and $t_7$ 513 with a confidence level of 80%, and the third segment between $t_7$ 513 and $t_8$ 515 with a confidence level of 40%, the segment with the confidence level of 100% is much shorter than the corresponding segment in FIG. 8A, while the segment with the confidence level of 40% is much longer than the corresponding segment in FIG. 8A. This confidence level distribution may be a reflection of busy traffics and/or worse road conditions, which creates more uncertainty in the planned path.

In one embodiment, the paths illustrated in FIG. 8A and FIG. 8B can be generated during different planning cycles, with the path in FIG. 8B generated in a later planning cycle.

Figure 9:
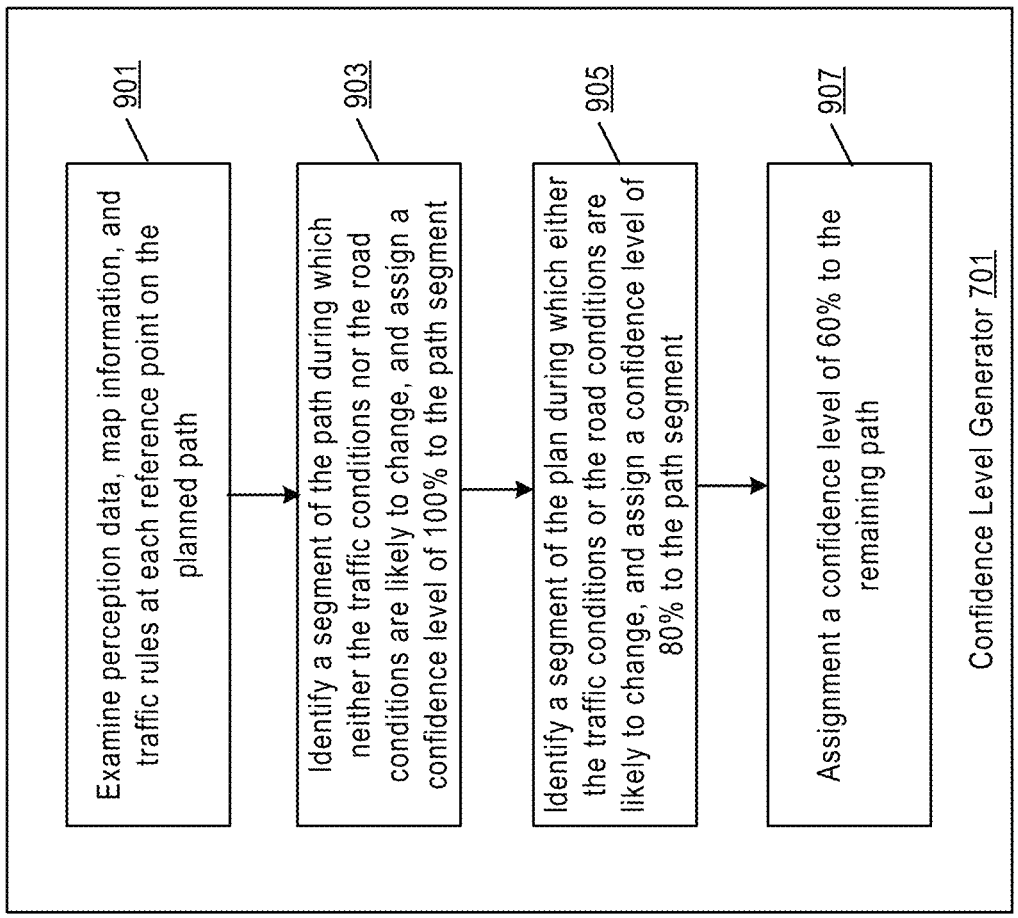
FIG. 9 illustrates a ruled-based algorithm for generating confidence levels for a planned path in accordance with an embodiment.

FIG. 9 illustrates a ruled-based algorithm for generating confidence levels for a planned path in accordance with an embodiment. This algorithm can be implemented using software, hardware, or a combination thereof.

As shown in FIG. 8, in operation 901, the confidence level generator 701 examines the collected perception data, map information, and/or traffic rules at each reference point on the planned path.

In operation 903, the confidence level generator 701 identifies a segment of the planned during which neither the traffic conditions nor the road conditions are likely to change, and assignment a confidence level of 100% to that path segment. In this operation, the confidence level generator 701 can first determine whether there is any traffic in a perceived driving environment. If there is no traffic in the perceived driving environment, the confidence level generator 701 can determine that the traffic conditions are not likely to change, and can calculate a segment of the planned path that should be assigned a 100% confidence level. In one embodiment, to calculate the length of the segment of the planned path, the confidence level generator 701 can determine a period of time based on a perception range of the ADV and a largest relative speed of the ADV possible in the driving environment. With the period of time calculated, the confidence level generator 701 can calculate a distance on the planned path based on the period of time.

In one embodiment, the period of time calculated based on the perception range of the ADV and the largest relative speed of the ADV is a time period during which no traffic can interfere with the operation of the ADV.

In one embodiment, the perception range is the largest detection range of either the LiDAR device mounted on the ADV or the camera unit mounted on the ADV or the Radar unit mounted on the ADV, and the largest relative speed of the ADV is the sum of the speed limit of the driving environment and the current speed of the ADV. In one embodiment, the largest relative speed represents a speed of the ADV relative to another vehicle driving into the perception range from an opposite direction.

For example, if the ADV is travelling at speed of 33 miles per hour on a road segment with a speed limit of 35 miles per hour, and the sensors of the ADV with a perception range of 500 meters (approximately 0.310686 mile) do not detect any traffic, the confidence level generator 701 can calculate a period of time as $0.310686/(35+33) \approx 0.00456891176$ hours$\approx 16.45$ seconds. Accordingly, the confidence level generator can assign a confidence level of 100% to a segment of the planned path in the first 16 seconds.

If there are traffics in the perception area, the confidence level generator 701 can determine whether the ADV is driving in a lane with solid lane lines, and if it is, the confidence level generator 701 can also assign a confidence level of 100% to the segment of the planned path that is in the lane with the solid lane lines.

If there are traffics in the perception range, and the ADV is not driving in a lane with solid lane lines, the confidence level generator 701 can assign a confident level of 100% to a predetermined segment of the planned path (e.g., the first next 2 seconds of the planned path). The assumption is that regardless of traffic conditions and road conditions, the first two seconds of the planned path is always reliable.

In operation 905, the confidence level generator 701 identifies a next segment of the plan during which either the traffic conditions or the road conditions are likely to change, and assign a confidence level of 80% to the path segment.

In one embodiment, traffic conditions are likely to change when there are traffics in the perception area, and the ADV is not driving in a lane with solid lane lines. In such a situation, the confidence level generator 701 can identify the next 4 segments as the next segment.

In operation 907, the confidence level generator 107 can assign a confidence level of 60% to the remaining of the planned segment.

In the above example algorithm, the confidence level assigned to each segment is for illustration purposes only, and can be changed based on actual implementations.

The above algorithm is one way for generating confidence levels for a planned path, and many other algorithms or methods can be used based on the perception data, map data, and traffic rules.

For example, another algorithm can divide any planned path into only two segments, the first segment with a confidence level of 100% and the rest of the planed path with a confidence of 50%. The first segment is determined in the manner as described in operation 901. The second segment is whatever is left of the planned path after deducting the first segment.

In another embodiment, an algorithm for generating confidence level for a planned path can be completely based on the prediction module 303. If during a particular segment, the prediction module can accurately predict the movement of the obstacles around the ADV during the particular segment, the particular segment of the planned path would be given a confidence level of 100%. The remaining of the planned path during which the obstacles around the ADV cannot be accurately predicted would be given a confidence level of 50%.

In another embodiment, a neural network model, e.g., a convolutional neural network, can be trained based on perception data, map information, and traffic rules collected from a particular road segment. The trained neural network model can be trained to identify only a first segment of the planned path (e.g., the first 2 seconds) and would assign a confidence level of 100% to the first segment, and would give a default confidence level of 50% to the remaining path.

Figure 10:
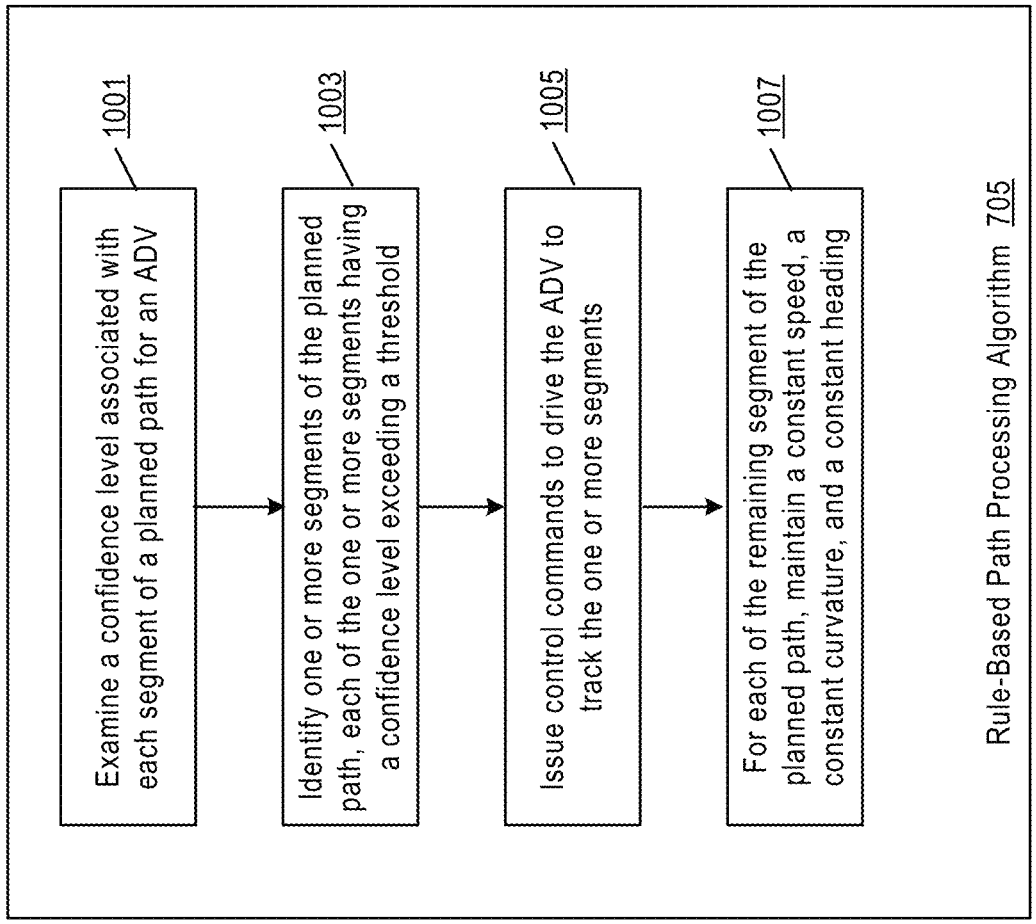
FIG. 10 illustrates the rule-based planned path processing algorithm 705 in accordance with an embodiment.

FIG. 10 illustrates the rule-based planned path processing algorithm 705 in accordance with an embodiment. This algorithm can be implemented using software, hardware, or a combination thereof.

In one embodiment, in operation 1001, after receiving a planned path together with a confidence level for each segment from the planning module 305, the control module 306 can perform an analysis of the information, including a reference point and associated parameters of the reference point, and confidence levels for the path. The control module 306 can determine in this operation the number of reference points in each segment.

In operation 1003, the control module 306 can identify one or more segments of the planned path whose confidence levels exceed a threshold. As an example, if the planned path includes three segments with a confidence level of 100%, 94% or 50% respectively. The control module 306 can set the threshold at 90%. Thus, the segment with the confidence level of 100% and the segment with the confidence level of 94% can be identified.

In operation 1005, the control module can issue multiple sets of control commands in a sequence to drive the ADV to track the one or more segments of the planned path.

In operation 1007, the control module 306 can maintain constant parameters (e.g., a constant speed, a constant curvature, and a constant heading) for the rest of the planned heading. The constant parameters can be predetermined based on collected driving statistics previously. For example, for each of the remaining segment, the control module 306 can issue commands to maintain a constant speed of 35 miles per hour, a zero curvature, and a heading of the ADV at the end of the last segment that has a 100% confidence level. Thus, the ADV is effectively disregard the remaining segments of the planned path.

In one embodiment, disregarding the remaining segments of the planned path would not pose dangers to the ADV because before the ADV reaches any of the remaining segments, a new planned path would have been generated to guide the ADV.

In one embodiment, disregarding a planned path segment means that the control module can dynamically adjust the control parameters based on the confidence level of the planned path segment. The control module is a model predictive control, and thus can look forward a predetermined number of seconds (e.g., 3 seconds or 5 seconds) down the planned path, and take actions in advance based on confidence levels of the path segments for the predetermined number of seconds.

As an illustrative example, if the planning module generates a planned path including a path segment (e.g., next 5 seconds) with a 100% confidence level, the control module, once receiving the planned path, can issue control commands to add accelerations to drive the vehicle to up to the speed limit. However, if the confidence level for the same path segment is only 40%, which can mean the vehicle is only 40% confident that there is no obstacle in the next 5 seconds, the control module can start to decelerate before entering the path segment and prepare to brake soon, in case the obstacle appears.

Thus, the control module can issue control commands to bring the vehicle up to an expected driving state for a path segment with a confidence level exceeding a predetermined threshold (e.g., desire speed, desire heading, etc.). The control module can also adjust control commands in advance for a path segment with confidence level below the predetermined threshold, in anticipation of some dangerous driving situations. As discussed above, one way to adjust the control commands is to issue constant control commands before entering the low-confidence-level path segment.

Figure 11:
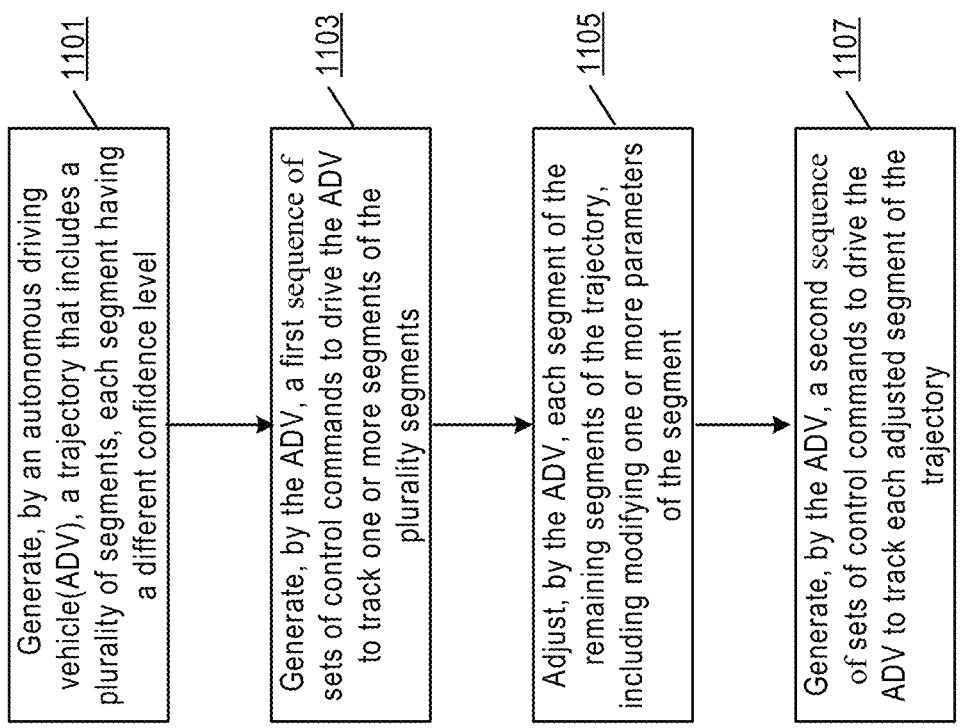
FIG. 11 illustrate a process of providing safety-guaranteed control according to one embodiment.

FIG. 11 illustrate a process of providing safety-guaranteed control according to one embodiment. The process may be performed by a processing logic which may include software, hardware, or a combination thereof. For example, the process may be performed by the planning module 305 and the control module 306 described in FIG. 7.

As shown in FIG. 11, in operation 1101, the processing logic generates a path that includes a plurality of segments, each segment having a different confidence level. In operation 1103, the processing logic generates a first sequence of sets of control commands to drive the ADV to track one or more segments of the plurality segments, each of the one or more segments with a confidence level exceeding a predetermined threshold. In operation 1105, the processing logic adjusts each segment of the remaining segments of the path, including modifying one or more parameters of the segment. In operation 1107, the processing logic generates a second sequence of sets of control commands to drive the ADV to track each adjusted segment of the path.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by a processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), comprising:
generating, by the ADV, a path that includes a plurality of segments, each segment having a different confidence level, wherein the confidence level of each segment of the plurality of segments of the path is generated using a set of rules based on perception data, map information, and traffic rules;
generating, by the ADV, a first sequence of sets of control commands to drive the ADV to track one or more segments of the plurality segments, each of the one or more segments with a confidence level exceeding a predetermined threshold;
adjusting, by the ADV, each segment of the remaining segments of the path, including modifying one or more parameters of the segment; and
generating, by the ADV, a second sequence of sets of control commands to drive the ADV to track each adjusted segment of the path.

2. The computer-implemented method of claim 1, wherein the one or more parameters that are modified include one or more of a speed, heading, or acceleration of the ADV at each point on that adjusted segment.

3. The computer-implemented method of claim 2, wherein each of the one or more parameters is modified to be a predetermined constant value.

4. The computer-implemented method of claim 1, wherein the confidence level of each segment of the plurality of segments of the path is generated using a trained neural network model.

5. The computer-implemented method of claim 1, wherein the neural network model is to generate a confidence level for only a first segment of the path, and wherein a planning module provides a default confidence level for the rest of the path.

6. The computer-implemented method of claim 1, wherein the path and a confidence level for each segment of the path is passed from a planning module of the ADV to a control module of the ADV.

7. A non-transitory machine-readable medium having instructions stored therein for operating an autonomous driving vehicle (ADV), wherein the instructions, when executed by a processor, cause the processor to perform operations, the operations comprising:
generating, by the ADV, a path that includes a plurality of segments, each segment having a different confidence level, wherein the confidence level of each segment of the plurality of segments of the path is generated using a set of rules based on perception data, map information, and traffic rules;
generating, by the ADV, a first sequence of sets of control commands to drive the ADV to track one or more segments of the plurality segments, each of the one or more segments with a confidence level exceeding a predetermined threshold;
adjusting, by the ADV, each segment of the remaining segments of the path, including modifying one or more parameters of the segment; and
generating, by the ADV, a second sequence of sets of control commands to drive the ADV to track each adjusted segment of the path.

8. The non-transitory machine-readable medium of claim 7, wherein the one or more parameters that are modified include one or more of a speed, heading, or acceleration of the ADV at each point on that adjusted segment.

9. The non-transitory machine-readable medium of claim 8, wherein each of the one or more parameters is modified to be a predetermined constant value.

10. The non-transitory machine-readable medium of claim 7, wherein the confidence level of each segment of the plurality of segments of the path is generated using a trained neural network model.

11. The non-transitory machine-readable medium of claim 7, wherein the neural network model is to generate a confidence level for only a first segment of the path, and wherein a planning module provides a default confidence level for the rest of the path.

12. The non-transitory machine-readable medium of claim 7, wherein the path and a confidence level for each segment of the path is passed from a planning module of the ADV to a control module of the ADV.

13. A data processing system, comprising:
a processor; and
a memory coupled to the processor to store instructions for operating an autonomous driving vehicle (ADV), which when executed by the processor, cause the processor to perform operations, the operations comprising:
generating a path that includes a plurality of segments, each segment having a different confidence level, wherein the confidence level of each segment of the plurality of segments of the path is generated using a set of rules based on perception data, map information, and traffic rules,
generating a first sequence of sets of control commands to drive the ADV to track one or more segments of the plurality segments, each of the one or more segments with a confidence level exceeding a predetermined threshold,
adjusting each segment of the remaining segments of the path, including modifying one or more parameters of the segment, and
generating a second sequence of sets of control commands to drive the ADV to track each adjusted segment of the path.

14. The data processing system of claim 13, wherein the one or more parameters that are modified include one or more of a speed, heading, or acceleration of the ADV at each point on that adjusted segment.

15. The data processing system of claim 14, wherein each of the one or more parameters is modified to be a predetermined constant value.

16. The data processing system of claim 13, wherein the confidence level of each segment of the plurality of segments of the path is generated using a trained neural network model.

17. The data processing system of claim 13, wherein the neural network model is to generate a confidence level for only a first segment of the path, and wherein a planning module provides a default confidence level for the rest of the path.

* * * * *